July 29, 1941.　　　L. S. DEWEES　　　2,251,040
MEANS FOR MEASURING ROTATION OF APPARATUS WITHIN DRILL PIPE OR THE LIKE
Filed Jan. 9, 1939　　　2 Sheets-Sheet 1
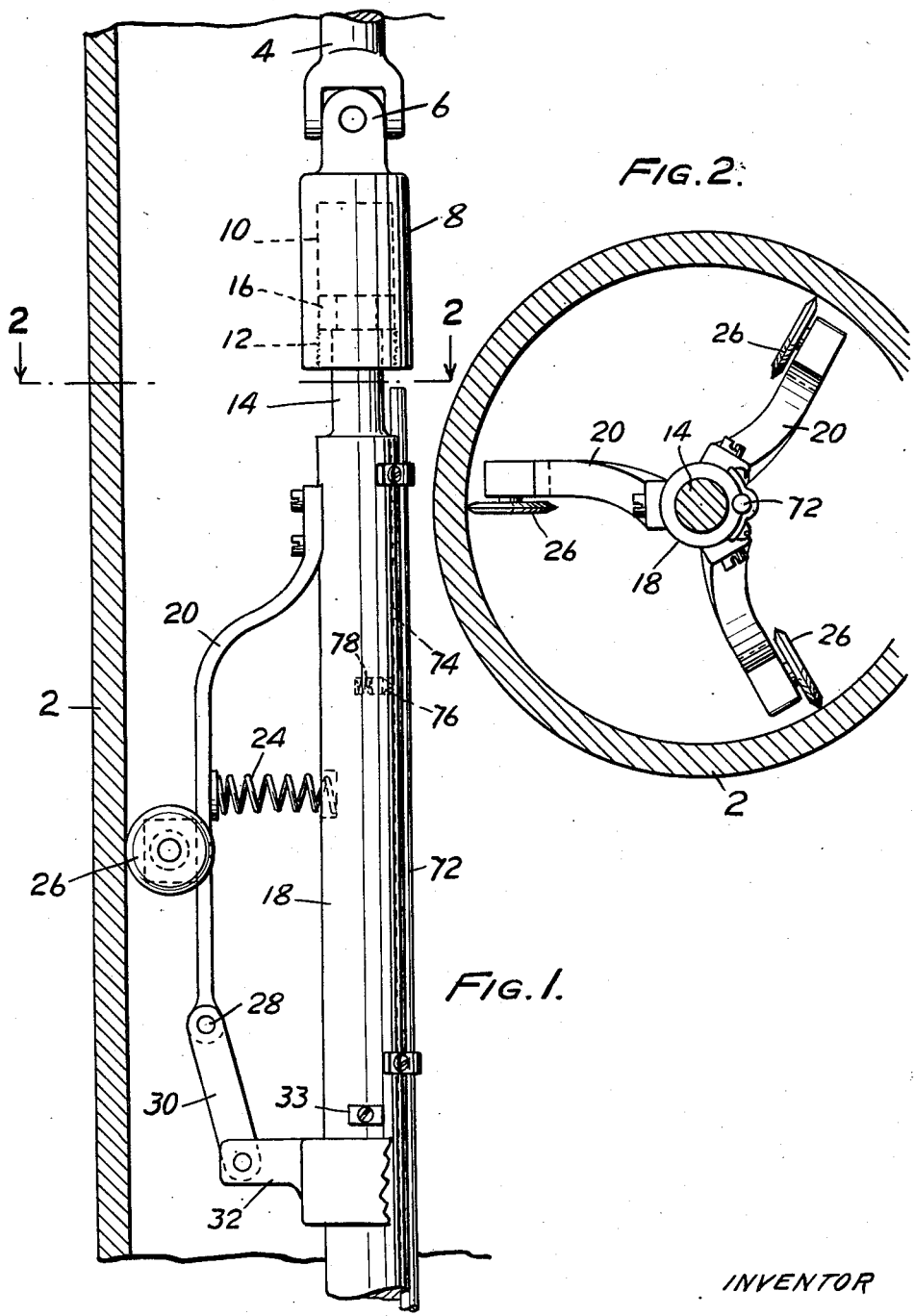
INVENTOR
Leonard S. Dewees
BY
Busser & Harding
ATTORNEYS.
WITNESS:
Robt R. Kitchel.

July 29, 1941.  L. S. DEWEES  2,251,040
MEANS FOR MEASURING ROTATION OF APPARATUS WITHIN DRILL PIPE OR THE LIKE
Filed Jan. 9, 1939  2 Sheets-Sheet 2

INVENTOR
Leonard S. Dewees
BY
ATTORNEYS

WITNESS:

Patented July 29, 1941

2,251,040

UNITED STATES PATENT OFFICE 2,251,040

MEANS FOR MEASURING ROTATION OF APPARATUS WITHIN DRILL PIPE OR THE LIKE

Leonard S. Dewees, Houston, Tex., assignor to Sperry-Sun Well Surveying Company, Philadelphia, Pa., a corporation of Delaware Application January 9, 1939, Serial No. 249,862

7 Claims. (Cl. 33—1)

This invention relates to means for measuring the rotation of apparatus being lowered through drill pipe or the like into a bore hole.

It has been customary to make checks of the progress of drilling of a bore hole by lowering within the drill pipe apparatus which will give indications of the inclination of the hole at various points. In view of the fact that drill pipe is made of magnetic ferrous materials (non-ferrous materials of sufficient strength being much too costly for practical use), it has not been possible heretofore to make complete records of the path of a bore hole by lowering any magnetic instrument within a drill string, nor has it been possible to do that for cased portions of the bore hole for the same reason.

The magnetic material used for drill strings or for casing has made it necessary to use either gyroscopic instruments for complete surveys or, in the case of cased portions of holes, to use the drill stem orientation method in which an instrument is lowered by means of a so-called oriented drill stem the sections of which are lined up relatively to each other.

It is a broad object of the present invention to provide means whereby an indication may be had of the azimuthal position of a well surveying instrument or tool or the like which has been lowered within a drill string or within a casing under such conditions as to preclude the use of a magnetic compass for giving indications of azimuth. Specifically, in accordance with the invention an arrangement is provided which continuously indicates any rotational movements of an apparatus (for example, a well surveying instrument or tool) relative to a stationary drill stem or casing through which it is being lowered. In accordance with the preferred embodiment of the invention, the indicating apparatus may be locked when the apparatus reaches a predetermined position so as to preserve an indication of the azimuthal position of the apparatus at such location until observation of the indicating means at the surface can be made.

There have been proposed types of apparatus intended for the purpose of indicating the rotation of instruments supporting rods or the like within bore holes as, for example, the apparatus described in the patents to Williams, 1,905,200 and 1,907,168. Such apparatus, however, fails to make correction for varying diameters of the holes through which the apparatus is lowered and is not adaptable except for the purpose of giving rough indications when very little if any rotation of the apparatus occurs during the lowering operation. In the event that the apparatus is lowered on a wire line, however, a considerable number of complete rotations might well be expected during the lowering and consequently considerable accuracy of indication is necessary if the azimuthal position of a well surveying instrument is to be ascertained within a few degrees.

The above indicated objects and more specific objects of the invention will become apparent from the following description, read in conjunction with the accompanying drawings, in which:

Figure 1 is a fragmentary sectional view through a portion of a drill stem in which the upper portion of the improved apparatus is located;

Figure 2 is a transverse section taken on the plane the trace of which is indicated at 2—2 in Figure 1;

Figure 5:
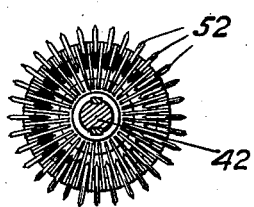
Figure 5 is a horizontal section taken on the plane the trace of which is indicated at 5—5 in Figure 3.

A portion of a drill stem through which the instrument is passing is indicated at 2. In accordance with the invention, a sinker bar 4 is lowered by means of a wire line or suitably connected rods through the drill stem and carries through the medium of the swivel joint indicated at 6 a member 8 which is provided with a bore 10 in the mouth of which there is located a threaded collar 12 through an opening in which there projects a stem 14 carrying at its upper end a head 16 which cannot pass downwardly through the collar 12 and which is adapted to have a limited movement relative to the member 8 within the bore 10.

The stem 14 consists of an upward extension of a supporting rod 18. At the upper end of this supporting rod there are located, as indicated in Figure 2, three spring steel levers 20, which are pressed outwardly by means of strong springs 24 to cause discs 26 carried by the levers to engage the inside walls of the drill stem sections. Each of the levers is pivoted at 28 to a link 30 which is in turn pivoted to a collar 32 sliding upon the rod 18 and having its upward movements limited by a stop 33. The connection of all the links 30 to the collar 32 insures that all three of the rollers 26 will move outwardly to the same extent in case of widening of the bore of the interior of the drill stem or, conversely, to move correspondingly inwardly. The result is that the rod 18 is maintained in central position within the drill stem, irrespective of reasonable variations in its inside diameter.

The centralizing devices just indicated are preferably duplicated immediately below the arrangement indicated in Figure 1 in order that at no time will the discs 26 of both of these arrangements simultaneously engage a tool joint. The result is that centralization of the upper portion of the stem 14 will be effected even when tool joints are being passed.

Figure 3:
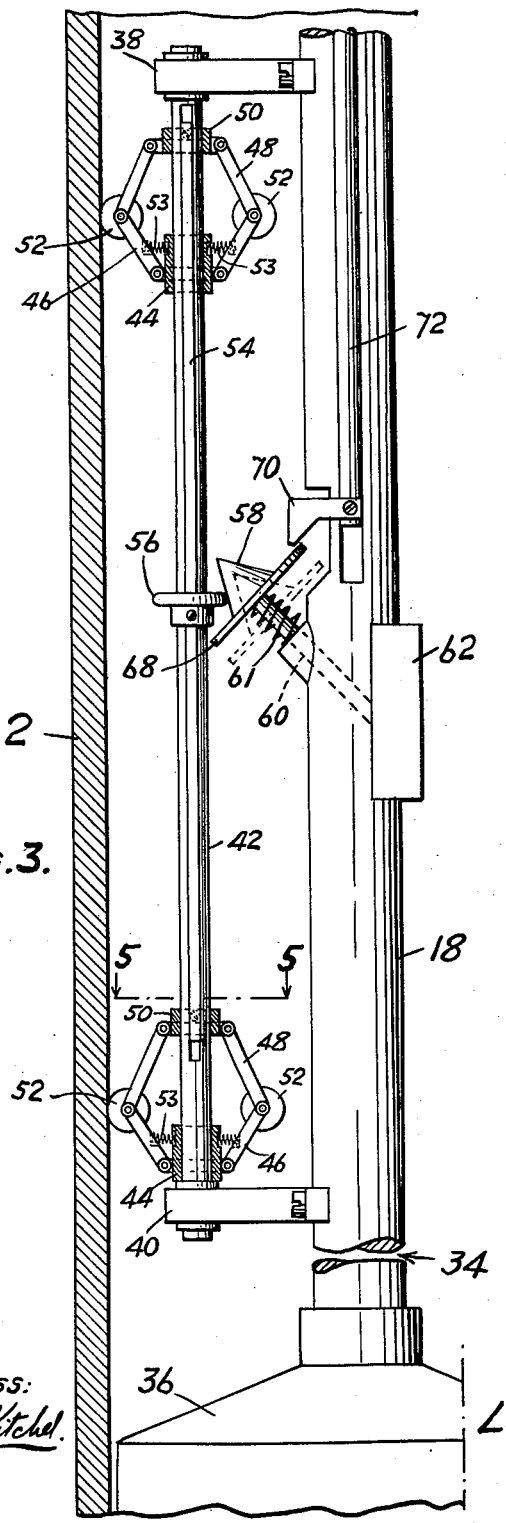
Figure 3 is a fragmentary vertical section showing the measuring portions of the improved apparatus and also indicating the top of a well surveying instrument connected thereto.

Additionally, the same centralizing arrangements are duplicated in the region indicated broken at 34 in Figure 3, i. e., below the rotation measuring apparatus illustrated in Figure 3. By thus providing four sets of the centralizing means defined, centralization of the rod 18 is secured through the region where measuring takes place. Somewhere below the lower centralizing apparatus there may be secured to the rod 18 in any suitable rigid fashion the apparatus, such as a well surveying instrument 36, the azimuthal position of which is to be determined. While any suitable connection may be used, it must be of such nature that relative rotation between the apparatus 36 and the rod 18 will not occur. It will be evident that the invention may be applied to secure an indication of the azimuthal position of a well surveying device or some other apparatus such as a tool, core barrel or the like.

Secured to the central portion of the rod 18 are brackets 38 and 40, which have journalled in them at its upper and lower ends a shaft 42. This shaft 42 carries duplicate drill stem engaging measuring means, each of which comprises a collar 44 secured to the shaft 42 to which are pivoted a considerable number of links 46, for example, numbering twenty to forty, to which are, in turn, pivoted links 48, pivotally secured to an upper collar 50, which closely surrounds the shaft 42 but is slidable thereon. At each of the junctions of the links 46 and 48 there is provided a disc 52 having a sharp edge arranged to engage the inside wall of the drill stem. The discs 52 are arranged with their sharp edges tangent to the vertical elements of the cylindrical inside of the drill stem so that while free upward and downward movements occur between the discs and the drill stem, by rolling of the discs upon their pivotal supports relative transverse movements are effectively prevented. The discs 52 are urged into tight engagement with the drill stem walls by means of springs 53 acting upon the links 46.

Figure 4:
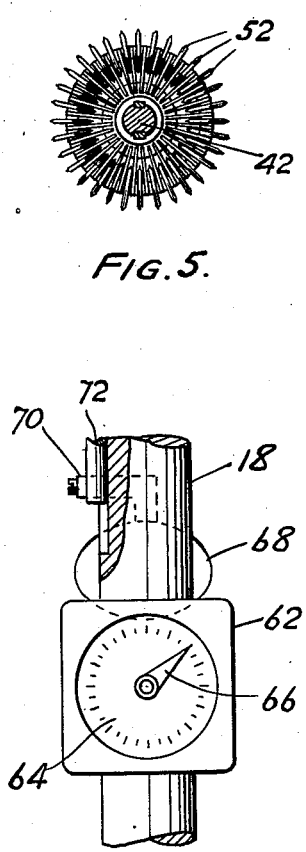
Figure 4 is a side elevation partly in section, showing the rotation indicating means.

The upper slidable collars 50 are connected by means of rods 54 arranged to slide within grooves in the shaft 42. Secured to these rods is a friction roller 56, which is arranged to drive a driven friction member 58 carried by a shaft 60, which is connected by suitable gearing within a box 62 to a pointer 66, movable relatively to a dial 64 as indicated in Figure 4. A spring 61 urges the shaft 60, which is arranged for lengthwise sliding movements in a direction to cause tight frictional engagement between the members 56 and 58.

The pointer 66 is arranged to indicate the relative rotation between the rod 18 and the drill stem. It will be obvious that when relative rotation occurs, the shaft 42 will be rotated by engagement of the discs 52 with the inside of the drill stem. It will also be evident, however, that the rotation of the shaft 42 for a given relative rotation between the rod 18 and the drill stem will depend upon the inside diameter of the drill stem. Since this varies in modern drill stems, though not to any great extent since the tolerance in manufacture is small, provision must be made to change the ratio of drive between the shaft 42 and pointer 66 to depend upon the changes in diameter of the drill stem. It is for this purpose that the friction disc 56 is arranged to drive a member 58, which is of a tapered form arranged to automatically make this correction. As the disc 56 moves up or down, correspondingly to the inward or outward movements of the discs 52 as they follow the interior of the drill stem, the drive ratio is changed and the movement of the pointer 66 is thus made to correspond with the rotation of the rod 18 relative to the drill stem. The scale of movement of the pointer 66 is preferably fairly large, so that, for example, a rotation of the pointer 66 through one revolution corresponds to a rotation of the rod 18 through one revolution. Thus, even slight angular movements of the rod 18 are recorded.

Provision must be made to stop the movements of the pointer 66 at the time when the apparatus such as 36 reaches its desired position where its azimuth is to be ascertained. Accordingly, there is provided a vertically moving rod 72, secured to the rod 18 and carrying a locking member 70 adapted to engage a disc 68 carried by the member 58 and, upon downward movement, press it against the action of a spring 61 to a position to definitely disengage 58 from 56. The actuation of the rod 72 may be effected in any desired fashion but, as indicated, this action is secured by causing the sinker bar 4 to move downwardly under its own weight after the apparatus 36 has come to rest. By such action the end 8 is caused to engage the upper end of the rod 72 and move it downwardly to a position where it is held by engagement of a detent 76 under the action of a spring 78 within a notch 74 in the rod 72.

The two sets of discs 52 are provided so as to avoid any trouble due to passage of joints, the spacing between the upper and lower sets being such that when one engages a joint the other will be between the joints on a smooth portion of the interior of the drill stem.

It will be clear that by the use of the described apparatus the azimuthal position of a device 36 which is lowered within a drill stem, or within a casing, may be ascertained if initially the azimuthal position of the rod 18 and the relative positions of the rod 18 and apparatus 36 are known. No care need be taken to insure that drill stem sections are lined up to lower the apparatus, as in the case of the drill stem orientation method and, as a matter of fact, the lowering may be done on a wire line as well as on rods or, if within a casing, on a drill stem. It may be noted that the discs 26, besides serving to centralize the rod 18, also serve to prevent substantial rotation of the rod 18 with respect to the drill stem, particularly if their edges are relatively sharp so as to cut into the walls of the drill stem. Prevention of rotation to as great an extent as possible is desirable, since this will avoid any cumulative errors which would occur if very considerable rotation of the shaft 42 took place. It will be obvious that the apparatus should be empirically calibrated since the contact of the series of discs 52 with the cylindrical inner surface of the drill stem will be, in effect, the contact of a multi-sided polygon within a cylinder.

What I claim and desire to protect by Letters Patent is:

1. A device for measuring the rotation of apparatus being lowered within pipe in a bore hole comprising an element rotatable about an axis substantially parallel with the axis of the pipe and arranged to engage and be rotated by engagement with the interior of said pipe, indicating apparatus operatively related to said element and comprising a movable member for indicating the rotary movements of said element, and devices responsive to variations in the pipe diameters for varying the ratio of movements of said element and member to correct the indications of said indicating apparatus for varying pipe diameters.

2. A device for measuring the rotation of apparatus being lowered within pipe in a bore hole comprising an element rotatable about an axis substantially parallel with the axis of the pipe and arranged to engage and be rotated by engagement with the interior of said pipe, mounting devices maintaining the axis of rotation of said element at substantially a fixed distance from the axis of said pipe irrespective of the pipe diameter, and indicating apparatus for indicating the rotary movements of said element.

3. A device for measuring the rotation of apparatus being lowered within pipe in a bore hole comprising an element rotatable about an axis substantially parallel with the axis of the pipe and arranged to engage and be rotated by engagement with the interior of said pipe, indicating apparatus for indicating the rotary movements of said element, and devices responsive to variations in the pipe diameters between said element and said indicating apparatus for compensating for varying internal diameters of said pipe.

4. A device for measuring the rotation of apparatus being lowered within pipe in a bore hole comprising an element rotatable about an axis substantially parallel with the axis of the pipe and arranged to engage and be rotated by engagement with the interior of said pipe, mounting devices maintaining the axis of rotation of said element at substantially a fixed distance from the axis of said pipe, indicating apparatus for indicating the rotary movements of said element, and devices responsive to variations in the pipe diameters located between said element and said indicating apparatus for compensating for varying internal diameters of said pipe.

5. A device for measuring the rotation of apparatus being lowered within pipe in a bore hole comprising an element arranged to engage and be rotated by engagement with the interior of said pipe in accordance with the rotation of said apparatus relative to the pipe, indicating apparatus operatively related to said element and comprising a movable member for indicating the rotary movements of said element, and devices responsive to variations in the pipe diameters for varying the ratio of movements of said element and member to correct the indications of said indicating apparatus for varying pipe diameters.

6. A device for measuring the rotation of apparatus being lowered within pipe in a bore hole comprising an element arranged to engage and be rotated by engagement with the interior of said pipe, indicating apparatus for indicating the rotary movements of said element, and devices between said element and said indicating apparatus responsive to variations in the pipe diameters for compensating for variable internal diameters of said pipe so that said indicating apparatus will indicate the relative rotation between the apparatus and the pipe.

7. A device for measuring the rotation of apparatus being lowered within pipe in a bore hole comprising an element arranged to engage and be rotated by engagement with the interior of said pipe in accordance with the rotation of said apparatus relative to the pipe, indicating apparatus for indicating the rotary movements of said element, and locking devices for locking the indicating apparatus.

LEONARD S. DEWEES.